June 19, 1928.
F. BEEMER
1,674,087
DOUBLE ROW BALL BEARING WHEEL
Filed June 11, 1925
2 Sheets-Sheet 1
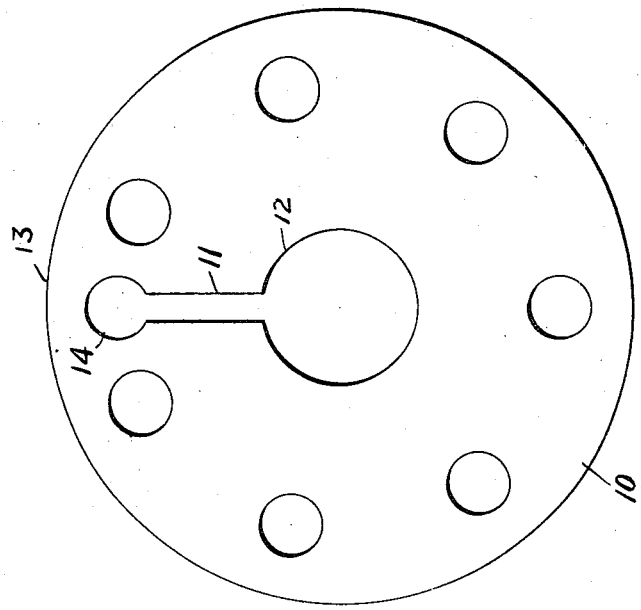
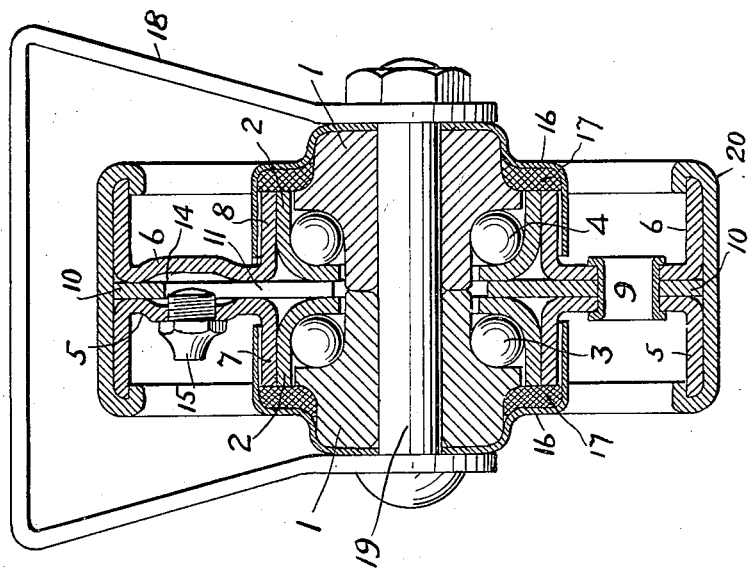
WITNESS:
INVENTOR
Frank Beemer
BY
Augustus B Shoughton
ATTORNEY.

June 19, 1928.

F. BEEMER 1,674,087

DOUBLE ROW BALL BEARING WHEEL

Filed June 11, 1925   2 Sheets-Sheet 2

WITNESS:
Robt P Ketchel.

INVENTOR
Frank Beemer
BY
Augustus B Stoughton
ATTORNEY.

Patented June 19, 1928.

1,674,087

UNITED STATES PATENT OFFICE.

FRANK BEEMER, OF PHILADELPHIA, PENNSYLVANIA.

DOUBLE-ROW BALL-BEARING WHEEL.

Application filed June 11, 1925. Serial No. 36,561.

The principal objects of the present invention are, first, to provide double row ball bearing wheels which shall be comparatively inexpensive and simple to make and efficient and durable in use; second, to provide for lubricating the wheels in a reliable and convenient manner; and third, to avoid exposed revolving parts at the hub such as would take and wind lint, dust and the like.

Other objects of the invention will appear from the following description at the end of which the invention will be claimed.

In the following description reference will be made to the accompanying drawings forming part hereof and in which Figure 1 is a transverse sectional view of a wheel embodying features of the invention.

Fig. 2 is a face view of the plate of ring form shown in Fig. 1 and which is provided with an oil groove or slot.

Figure 4:
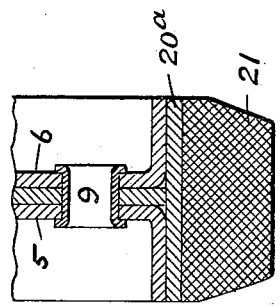
Fig. 3 is a view similar to Fig. 1 in which the relation and construction of the cup and cone elements are reversed and Figs. 4 and 5 are sections through the wheel rim showing modifications of tire construction.

In the drawings, referring to Figs. 1 and 2, 1 is a double cone element and 2 is a double cup element. At least one of these elements consists of two parts in a structure embodying features of the present invention. In Fig. 1 this requirement is met, and in fact both the cup and cone elements consist of two parts. There are two circles of balls 3 and 4 interposed between the elements 1 and 2 and arranged in spaced relation by the cup element 2. 5 and 6 are a pair of wheel disks and they are carried by the cup element 2, and they are provided with flanges 7 and 8 spanning both circles of balls and conforming to and having facial contact with the outer surface of the cup element. The tubular rivets 9 are an example of means for securing parts, such as the disks 5 and 6 to place. 10 is a plate of ring form arranged between the two-part element 2, and it is provided with a grease groove, channel or slot 11 extending and opening through its inner peripheral wall 12 but not through its outer peripheral wall 13. 14 is a grease inlet or intake provided as shown with a "Zerk" connection 15. Grease can be squirted into the slot 11 through the connection 15 as by means of a grease gun. The grease from the groove 11 lubricates the rows or circles of balls. 16 are dust-caps covering the flanges 7 and 8 and enclosing the inner and outer elements 1 and 2, and also the flanges 7 and 8. 17 are felt or like washers for the dust-cap. 18 is a yoke straddling the dust-caps 16 and preventing or opposing their rotation and also the rotation of the cone 1, so that at and near the hubs there are no exposed rotating parts such as would take up lint, waste and the like. 19 is a bolt passing through the arms of the yoke and through the cone 1. By withdrawing the bolt 19 and the yoke 18, and removing the dust-caps, elements 1 and 2 along with the balls can be removed for replacement or repairs.

Figure 3:
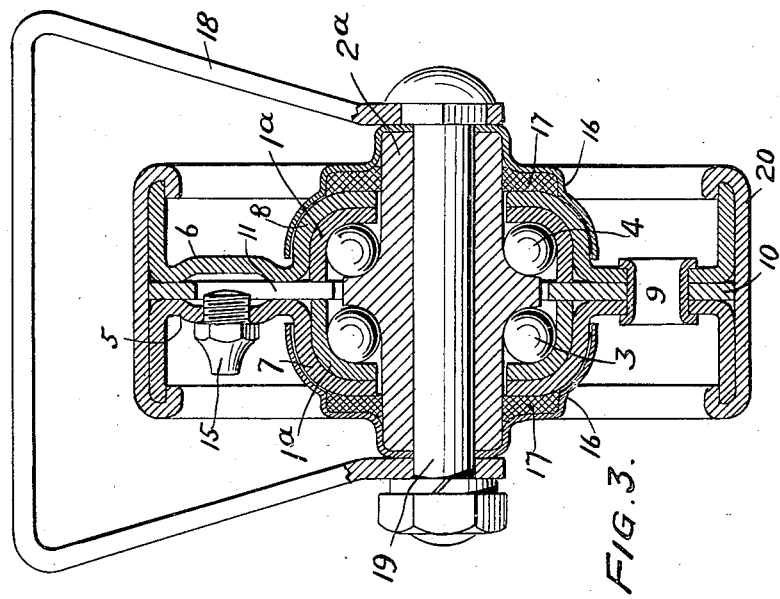

The construction and mode of operation of the modification shown in Fig. 3 are as above described except that the cone element $2^a$ is made in one piece and is arranged to space the two circles of balls, and the cup element $1^a$ is arranged to embrace the two circles of balls. This really amounts to a reversal of the construction of Fig. 1 in the respects indicated, consequently the identical parts or corresponding parts are designated by the same reference numbers in Fig. 3 as in Fig. 1. In the construction of Fig. 3 the parts cannot be so easily disassembled as they can be in the construction of Fig. 1.

Figure 5:
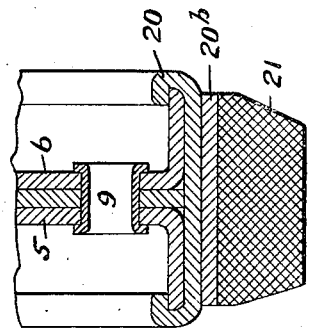

The rim structure may be variously constructed or modified. As shown in Figs. 1 and 3, it comprises a tire 20 of metal clamped onto the outer flanges of the wheel disks and enclosing the rim of the plate of ring form 10. As shown in Fig. 4 the tire $20^a$ is shrunk onto the rim of the wheel and is provided with a rubber tread 21. As shown in Fig. 5 the metal portion $20^b$ of the rubber tire is shrunk onto the clamped or crimped tire 20 of Fig. 1.

It will be obvious to those skilled in the art to which the invention relates that modifications may be made in details of construction and arrangement and in matters of mere form without departing from the spirit of the invention which is not limited in those regards or otherwise than as the prior art and the appended claims may require.

I claim:

1. A wheel having double cup and double cone elements of which at least one consists of two parts, two circles of balls interposed between said elements and spaced by one of said elements, a plate of ring form arranged between the two-part element and provided with a grease channel, a pair of wheel disks having flat webs and carried by the cup element and abutting on the faces of the ring plate and provided with flanges spanning both circles of balls, means for connecting the webs of the disks and the plate, dust-caps covering said flanges and enclosing the cone element, a yoke straddling said caps and preventing rotation thereof, and a bolt passing through the arms of the yoke and the cone element.

2. A wheel having a two-part double cone element, a two-part double cup element, two circles of balls interposed between said elements and spaced by the cup element, a plate of ring form arranged between the two parts of the cup element and provided with a grease groove, a pair of wheel disks having flat webs abutting on the faces of said plate and provided with flanges straddling both circles of balls and conforming to the parts of the cup element and provided with a grease inlet, means for connecting the webs of the disks and the plate, dust-caps covering said flanges and enclosing the cone element, a yoke straddling said caps and preventing rotation thereof, and a bolt passing through the arms of the yoke and the cone element.

FRANK BEEMER.